US008179916B2

(12) United States Patent
Kannan et al.

(10) Patent No.: US 8,179,916 B2
(45) Date of Patent: May 15, 2012

(54) PROPERLY PLAYING IN-BAND TONES BEFORE CALL ESTABLISHMENT WHEN PERFORMING PROTOCOL INTERWORKING

(75) Inventors: Vijay Arumugam Kannan, Milpitas, CA (US); Sandeep Singh Kohli, Fremont, CA (US); Paul E. Jones, Apex, NC (US)

(73) Assignee: Cisco Technology, Inc., San Jose, CA (US)

(*) Notice: Subject to any disclaimer, the term of this patent is extended or adjusted under 35 U.S.C. 154(b) by 1202 days.

(21) Appl. No.: 11/927,455

(22) Filed: Oct. 29, 2007

(65) Prior Publication Data

US 2009/0110171 A1  Apr. 30, 2009

(51) Int. Cl.
*H04M 3/42* (2006.01)
(52) U.S. Cl. ........ 370/466; 370/467; 370/352; 370/353; 370/354; 370/355; 370/356; 370/493; 370/494; 370/495; 370/496; 370/401; 379/207.16; 379/201.01; 379/201.07; 379/201.08; 379/201.09; 379/201.12; 379/207.02; 379/207.1; 379/100.13; 379/100.05

(58) Field of Classification Search .......... 370/401, 370/352–356, 466–467, 493–496; 379/207.16, 379/201.01, 201.07–201.09, 201.12, 207.02, 379/207.1, 100.13, 100.05
See application file for complete search history.

(56) References Cited

U.S. PATENT DOCUMENTS

| 5,926,537 | A  | * | 7/1999 | Birze ............................ 379/252 |
| 7,002,989 | B2 |   | 2/2006 | Agrawal |
| 2001/0046234 | A1 | * | 11/2001 | Agrawal et al. ............... 370/402 |
| 2004/0078468 | A1 | * | 4/2004 | Hedin et al. .................. 709/227 |
| 2005/0018659 | A1 | * | 1/2005 | Gallant et al. ................ 370/352 |
| 2006/0233176 | A1 | * | 10/2006 | Stumer ....................... 370/395.2 |
| 2007/0201663 | A1 | * | 8/2007 | Shi ............................. 379/201.01 |
| 2007/0248077 | A1 | * | 10/2007 | Mahle et al. .................. 370/352 |
| 2007/0286402 | A1 | * | 12/2007 | Jacobson ...................... 379/372 |
| 2007/0291106 | A1 | * | 12/2007 | Kenrick et al. ............. 348/14.01 |
| 2008/0118040 | A1 | * | 5/2008 | Shi ................................. 379/69 |
| 2008/0268821 | A1 | * | 10/2008 | Koskela ....................... 455/414.1 |

* cited by examiner

*Primary Examiner* — Joe Cheng
*Assistant Examiner* — Wutchung Chu
(74) *Attorney, Agent, or Firm* — Charles E. Krueger

(57) ABSTRACT

In one embodiment, interworking procedures between H.323 and SIP ensure that in-band tones and announcements, along with local and remote ringback, are properly played or generated.

14 Claims, 4 Drawing Sheets

PROPERLY PLAYING IN-BAND TONES BEFORE CALL ESTABLISHMENT WHEN PERFORMING PROTOCOL INTERWORKING

BACKGROUND OF THE INVENTION

Different protocols exist for establishing calls between endpoints coupled to a network. Two examples are the Session Initiation Protocol (SIP) and the H.323 protocols which are widely used as signaling protocols for Voice over IP (VoIP). A specification for SIP is available in RFC 3261 from the IETF and the H.323 standard is specified by the ITU.

Because SIP and H.323 are different protocols, an interworking function (IWF) must be used to connect calls between networks using the different protocols.

TECHNICAL FIELD

The present disclosure relates generally to defining interworking procedures between H.323 and SIP to ensure that in-band tones and announcements, along with local and remote ringback, are properly played or generated.

DESCRIPTION OF EXAMPLE EMBODIMENTS

Overview

Figure 1:
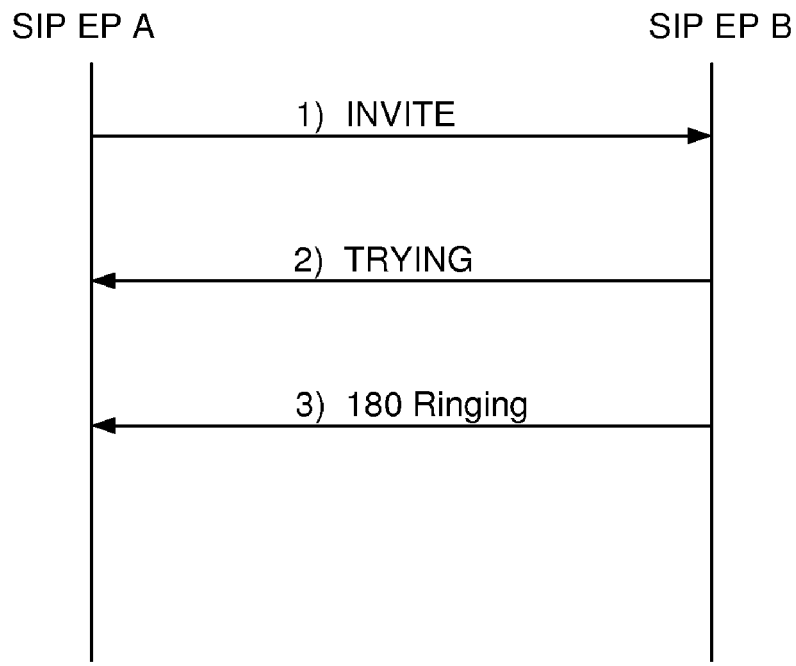
FIG. 1 illustrates an example of call establishment using SIP.

An example embodiment is described that monitors media sent from a SIP endpoint to an H.323 endpoint subsequent to the SIP endpoint sending a remote ringing 180 ringing message indicating that the SIP endpoint might send a ring tone to be played at the H.323 endpoint. A timer is started and a local ringback signal is generated at the H.323 endpoint if the timer expires and no remote media packets have been received from the SIP endpoint. The term endpoint applies to either an H.323 terminal or a SIP user agent.

Another example embodiment includes sending media originated at the H.323 endpoint to the SIP endpoint only if the H.323 endpoint intends that the media be played at the SIP endpoint.

Another example embodiment utilizes generalized protocols where local ringing is dependent on how the protocol should interpret the reception of media packets. For this embodiment, for calls in either direction a generalized indicator would be included in an initial message indicating that "presence of received media packets indicates remote ring back or announcements".

The receipt of this indicator at a calling endpoint causes the calling endpoint to play media when received and, optionally, to generate local ringback if no media were received before a timeout period. The receipt of this indicator at the called endpoint is used as a hint that is should not transmit media packets to the calling endpoint until such time as media should be played by the calling endpoint.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

A requirement of both the SIP and H.323 environment is the generation of ringback tones to inform the calling party that the called party is being alerted. If the ringback tone is not played, the calling party believes that the call is not progressing and may terminate the call prematurely.

H.323 defines procedures for playing in-band media, local ringback, and even switching between local and remote ring back. SIP is not so detailed in how such local tones are generated or when a remote audio stream is played. In general, a remote stream is played by a SIP endpoint when received and local ringback is generated if a 180 Ringing is received and no media arrives. This differs from H.323, wherein an explicit Progress Indicator Information Element has to be sent in order to force a media stream to be played. Interworking between the two systems requires special consideration, without which users will not necessarily hear the proper tones, announcements, or remote audio stream.

An overview of call establishment utilizing the SIP protocol will now be described with reference to FIG. 1. In step 1 the calling party sends a SIP request "INVITE" to the called party to indicate the calling party's wish to talk to the called party. This request contains the details of the voice streaming protocol. The Session Description Protocol (SDP) is used in the payload for this purpose. SDP is intended for describing multimedia sessions for the purposes of session announcement, session invitation, and other forms of multimedia session initiation.

In step 2 the called party reads the request and tells the calling party it has been received.

In step 3 the called party sends a 180 Ringing to inform the calling party that it is processing the request. Ring back needs to be considered at this point, and there are two possibilities. The first is local ringing where the ringing tone is generated at the calling party's location, and the second is remote ringing where the ringing tones are generated by the called party and media packets are sent to the calling party where they are played. After receipt of the 180 Ringing message, the calling party sets a timer and initiates local ringing when the timer expires if no media packets have been received from the called party.

An overview of call establishment utilizing the H.323 protocol will now be described with reference to FIG. 2. In the H.323 protocol in-band tones (for example, ringback and busy tones) and announcements (for example, "The number you have dialed is no longer in service") could be generated by the originating, terminating endpoints, or intermediate entities.

The indication of in-band tones and announcements is controlled by the Progress Indicator (PI) information element (IE) in H.323 networks. The Progress Indicator signals those interworking situations where in-band tones and announcements must be used. There is no provision in H.323 for playing received media if no Progress Indicator is used.

Figure 2:
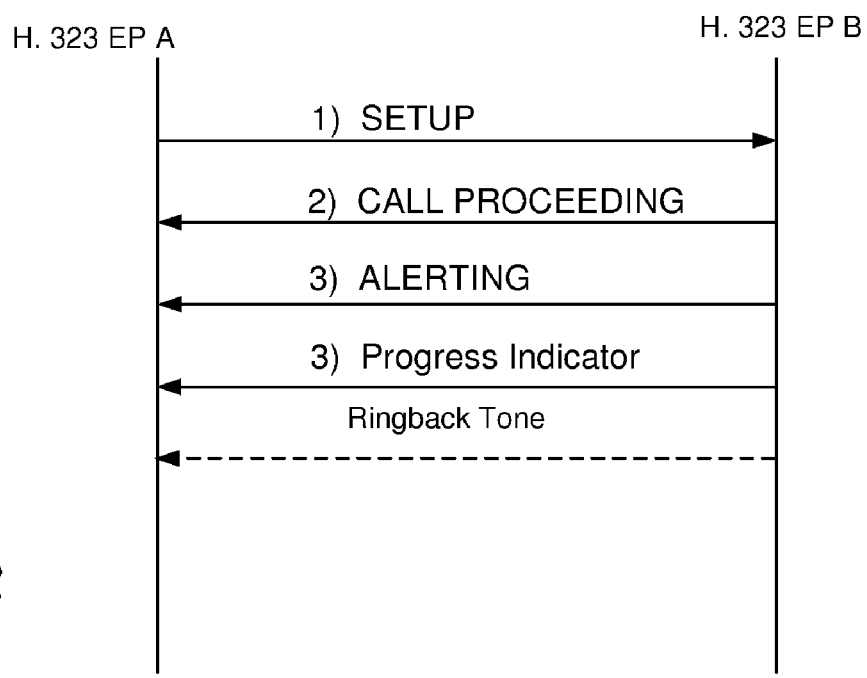
FIG. 2 illustrates an example of call establishment using H.323.

Referring now to FIG. 2, in step 1 the calling party sends a Setup message that requests a connection to the called party, and in step 2 the called party responds with a Call Proceeding message.

In step 3 the called party sends an Alerting. Additionally a progress indicator and ringback tone can be sent by the called party to cause the calling party to play the ringback tone transmitted by the called party. There is no provision in H.323 for timing out and generating local ringback if no ringback tone is received from the called party. Rather, receipt of an Alerting message without a progress indicator triggers local ringback in H.323.

An example embodiment will now be described that operates with an Interworking Function (IWF), for example a Session Border Controller (SBC), that proxies the media flows between a SIP endpoint and an H.323 endpoint. An example of this type of IWF is depicted in FIG. 3.

Figure 3:
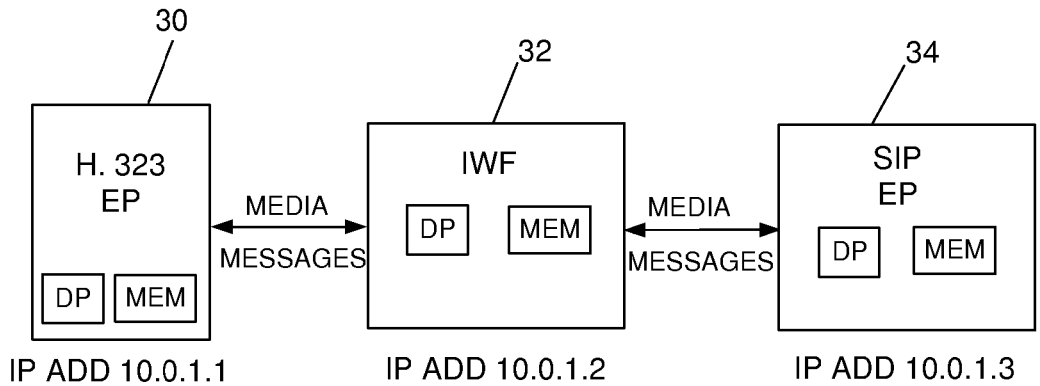
FIG. 3 illustrates an example of an interworking function that proxies media.

In FIG. 3 an H.323 endpoint 30, which includes a processor for executing the H.323 protocol, is coupled to an IWF 32, which may comprise a gateway server including a processor and memory. A SIP endpoint 34 is also coupled to the IWF 32.

Referring to FIG. 3, in this example the IWF proxies the media and both SIP and H.323 use the IP Address of the IWF (in this example 10.0.1.2) as the destination address for media packets. The IWF then forwards the media to the appropriate endpoint. The IWF also translates between H.323 messages and SIP messages. The operation of this example embodiment will be described for two cases.

Figure 4:
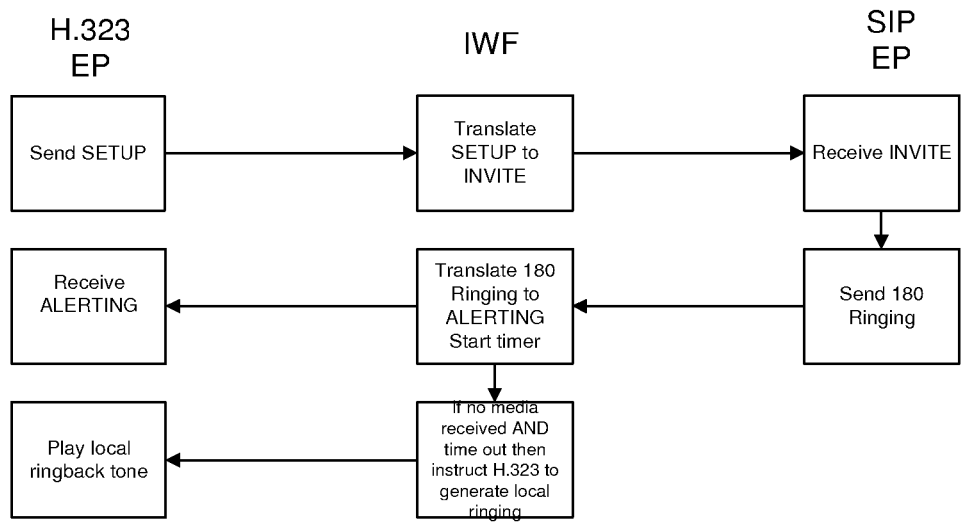
FIG. 4 illustrates the operation of a first example embodiment when an H.323 endpoint calls a SIP endpoint.

CASE A: The H.323 endpoint calls the SIP endpoint. Referring to FIG. 4, in step 1 the H.323 endpoint sends a SETUP message to the IWF which sends an INVITE message to the SIP endpoint. In step 2 the SIP endpoint sends a 180 Ringing message containing SDP to the IWF which sends an ALERTING message with an appropriate Progress Indicator to the H.323 endpoint that includes instruction to open media channels, with the assumption that media packets will soon arrive. As described above, no ringback tone will be generated if the SIP endpoint fails to send the ringback tone media. In this embodiment, the IWF is modified to maintain a timer that is started when the ALERTING message is sent. The IWF instructs the H.323 endpoint to generate local ringing if no ring tone is received at the IWF from the SIP endpoint once the timer expires.

By maintaining the timer in the IWF this embodiment assures that the user of the H.323 endpoint will hear a ring tone if the SIP endpoint fails to send the ring tone media.

In another embodiment of Case A, the IWF may choose not to send a Progress Indicator to the H.323 device until it receives media packets. An H.323 endpoint will ignore any received media packets unless explicitly signaled by the IWF to play those packets. Since a SIP endpoint shall, in theory, not transmit media packets unless there is media that should be heard, the IWF, upon seeing media packets flowing from the SIP endpoint, transmits a Progress Indicator (PI) to the H.323 endpoint with an appropriate value to provoke the H.323 endpoint to play the media packets.

CASE B: The SIP endpoint calls the H.323 endpoint. As described above, in general a remote media stream is played by a SIP endpoint when it is received. In some cases an H.323 endpoint might generate media that is not appropriate to be played, such as media packets that contain only silence.

Figure 5:
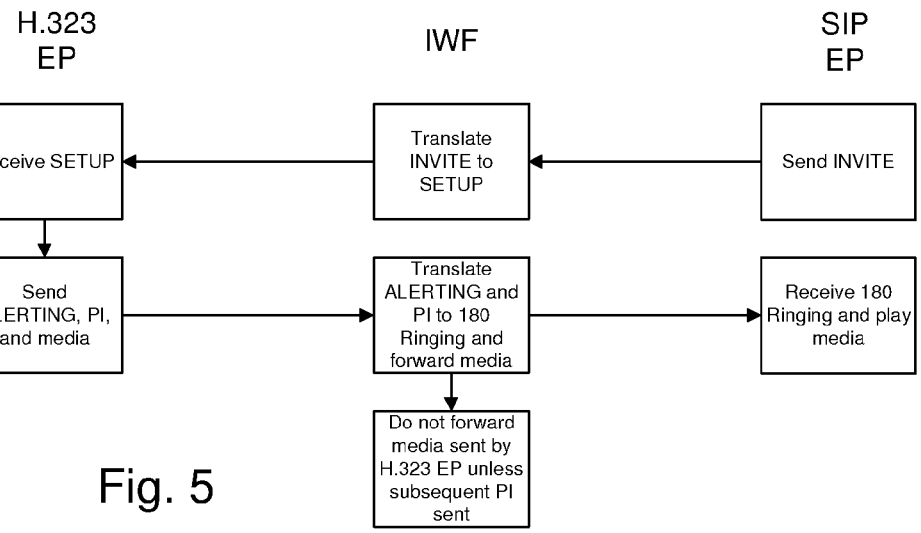
FIG. 5 illustrates the operation of the second example embodiment when a SIP endpoint calls an H.323 endpoint.

Referring to FIG. 5, in step 1 the SIP endpoint sends an INVITE message to the IWF which sends a SETUP message to the H.323 endpoint. In step 2 the H.323 endpoint sends an ALERTING and a ringback tone together with a Progress Indicator to the IWF which sends a 180 Ringing message and relays the ringback media to the SIP endpoint.

Accordingly, in this case the SIP endpoint will play media if and only if it receives in-band media. If it receives a 180 Ringing without also receiving media, then it will generate local ringback. Considering the foregoing stated behavior of the SIP, the IWF should not forward any RTP packets received by the H.323 endpoint until such time as it receives a Progress Indicator (PI) with an appropriate value. Prior to receiving said PI, the IWF discards any received audio packets from the H.323 endpoint. This will allow the SIP endpoint to generate local ringback as appropriate, avoiding unwanted silence for example. Upon receiving an appropriate PI value, the IWF forwards any subsequently received RTP packets.

In this embodiment, the IWF is modified so media packets sent by the H.323 endpoint to IWF will not be forwarded to the SIP endpoint unless an H.323 message (such as ALERT/PROGRESS, etc) with a PI is sent by the H.323 endpoint indicating that an in-band tone should be played.

Accordingly, the example embodiment described in connection with CASES A and B can be implemented by modifying the software of the IWF and no changes are required to the H.323 or SIP specifications. These modifications assure that the H.323 calling party will hear a ringback tone when calling a SIP called party and that no inappropriate media will be played when a SIP calling party calls an H.323 called party.

Another example embodiment will now be described that operates with an Interworking Function, for example a Session Border Controller (SBC), that does not proxy the media packets between a SIP endpoint and an H.323 endpoint. An example of this type of IWF is depicted in FIG. 6.

Figure 6:
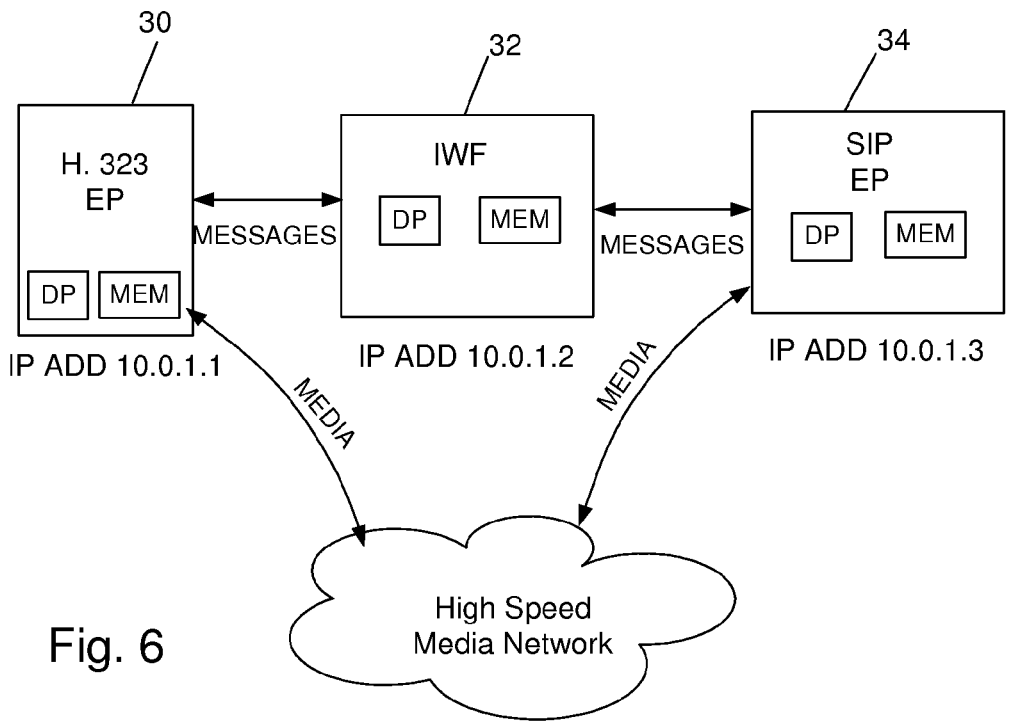
FIG. 6 illustrates an example of an interworking function that does not proxy media.

In FIG. 6, the media is transmitted using the H.323 and SIP endpoint IP addresses as destination addresses. Signaling messages are transmitted to the IP address of the IWF. In this non-proxy configuration the IWF has no information regarding the need to play in-band media or local ringback since it never sees the media. The operation of this example embodiment will be described for two cases.

Figure 7:
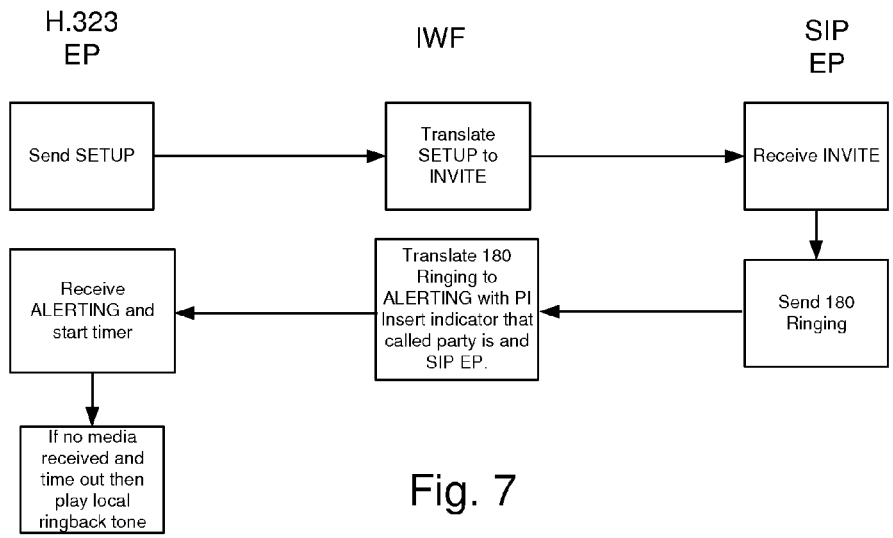
FIG. 7 illustrates the operation of a third example embodiment when an H.323 endpoint calls a SIP endpoint.

CASE C: The H.323 endpoint calls the SIP endpoint. Referring to FIG. 7, in step 1 the H.323 endpoint sends a SETUP message to the IWF which sends an INVITE message to the SIP endpoint. In step 2 the SIP endpoint sends a 180 Ringing message containing SDP to the IWF which sends an ALERTING message with a Progress Indicator to the H.323 endpoint that includes instruction to open media channels, with the assumption that media packets will soon arrive. In this example embodiment, an additional indicator is included in the ALERTING message informing the H.323 endpoint that the called party is a SIP endpoint. As described above, the H.323 endpoint does not maintain a timer so that no ringback tone will be generated if the SIP endpoint fails to send the ringback tone media. The H.323 endpoint then "acts" as a SIP endpoint and maintains a timer so that a local ringback tone is generated if the time expires and no ringback tone is received from the SIP endpoint.

In this example, the H.323 endpoint may choose to delay playing local ringback for a variable short period of time to ensure that any late-arriving remote media packets are given consideration, thus avoiding playing local ringback and then switching to the remote audio stream.

CASE D: The SIP endpoint calls the H.323 endpoint. As described above, in general a remote media stream is played by a SIP endpoint when it is received. In some cases an H.323 endpoint generates media that is not appropriate to be played, such as media packets that contain only silence.

Figure 8:
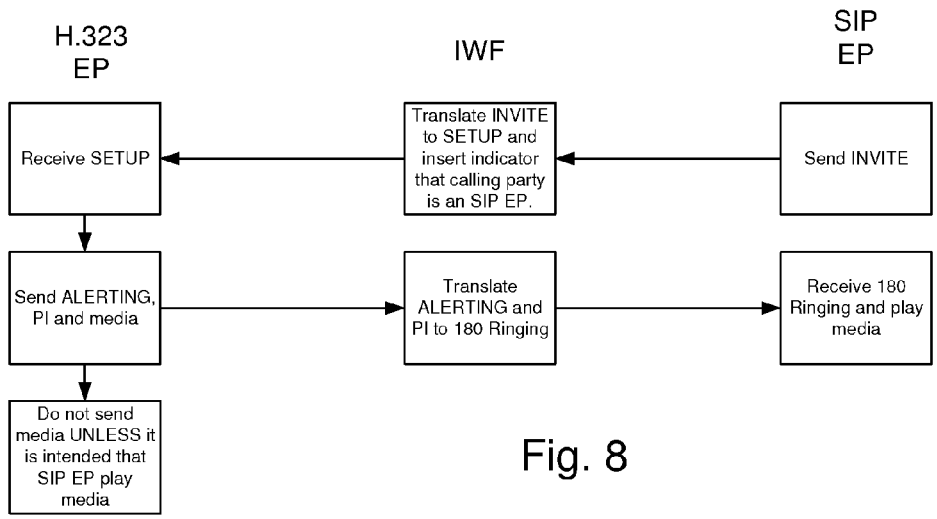
FIG. 8 illustrates the operation of the fourth example embodiment when a SIP endpoint calls an H.323 endpoint.

Referring to FIG. 8, in step 1 the SIP endpoint sends an INVITE message to the IWF which sends a SETUP message to the H.323 endpoint. The SETUP message has an indicator stating that the peer is a SIP endpoint. In step 2, the H.323 endpoint sends an ALERTING message, a progress indicator and a ringback tone to the IWF which sends a 180 Ringing message and ringback tone to the SIP endpoint. If the H.323 device instead preferred to force local ringback at the calling device, then it would use the aforementioned indicator as a hint that it should not transmit the Progress Indicator to indicate in-band media and would not transmit media packets until such time as media should be played to the calling party.

The above described embodiments have utilized H.323 and SIP endpoints. Another example embodiment will now be described for endpoints that utilize generalized protocols where local ringing is dependent on how the protocol should interpret the reception of media packets.

For this embodiment, the above-described cases C and D are modified as follows. For calls in either direction a generalized indicator is included in an initial message indicating that "presence of received media packets indicates remote ring back or announcements".

The receipt of this indicator at a calling endpoint causes the calling endpoint to play media when received and, optionally, to generate local ringback if no media were received before a timeout period. The receipt of this indicator at the called endpoint is used as a hint that is should not transmit media packets to the calling endpoint until such time as media should be played by the calling endpoint.

The invention has now been described with reference to the example embodiments. Alternatives and substitutions will now be apparent to persons of skill in the art. Accordingly, it is not intended to limit the invention except as provided by the appended claims.

What is claimed is:

1. A method, performed by a processor, comprising:
receiving SIP protocol messages and H.323 protocol messages at an interworking function used to connect calls between networks using the different protocols;
receiving, at the interworking function, a SIP protocol response message from a SIP protocol called endpoint after an H.323 protocol calling endpoint initiates a call, with the SIP protocol response message indicating that the SIP protocol called endpoint might send media including a ringback tone to be played at the H.323 protocol calling endpoint and where the SIP protocol causes a SIP protocol calling endpoint to start a timer when a SIP protocol response message is received so that ringback will be generated locally if no ringback media to be played is received at the SIP protocol calling endpoint before the timer expires;
translating the SIP protocol response message to an H.323 protocol alerting message at the interworking function;
sending the H.323 protocol alerting message and an H.323 protocol progress indicator from the interworking function to the H.323 protocol calling endpoint subsequent to receiving the SIP protocol response message at the interworking function, where the H.323 protocol calling endpoint generates a local ringback tone only if an H.323 protocol alerting message with no H.323 protocol progress indicator is received and where the H.323 protocol calling endpoint does not start a timer when an H.323 protocol alerting message and an H.323 protocol progress indicator are received;
maintaining a timer at the interworking function;
starting the timer maintained at the interworking function when the SIP protocol response message is received at the interworking function; and
sending an H.323 protocol alerting message without an H.323 protocol progress indicator from the interworking function to the H.323 protocol calling endpoint to instruct the H.323 protocol calling endpoint to play a local ringback tone if the timer expires and no media is received from the SIP protocol called endpoint at the interworking function.

2. The method of claim 1 further comprising:
proxying, at the interworking function, media sent by the SIP protocol endpoint and by the H.323 protocol endpoint.

3. The method of claim 1 further comprising:
sending a progress indicator when media is received from the SIP endpoint to instruct the H.323 endpoint to play the media.

4. The method of claim 1 where the interworking function is a session border controller.

5. The method of claim 1 where the SIP response message is a ringing message.

6. A method comprising:
receiving, receiving at the interworking function, a SIP protocol invite message that indicates a SIP protocol calling endpoint has initiated a call;
translating the SIP protocol invite message to an H.323 protocol setup message at the interworking function;
sending the H.323 protocol setup message from the interworking function to the H.323 protocol called endpoint;
receiving, at the interworking function, either an H.323 alerting message, ringback media and an H.323 progress indicator appropriate for forcing the playback of the ringback media from an H.323 protocol called endpoint in the case of remote ringback or receiving an H.323 protocol alerting message and no H.323 protocol progress indicator in the case of local ringback;
in the case of remote ringback:
translating the H.323 protocol alerting message to a SIP protocol 180 ringing message at the interworking function;
sending the SIP protocol 180 ringing and the ringback media to be played from the interworking function to the SIP protocol calling endpoint so that the SIP protocol calling endpoint plays the ringback media when received;
in the case of local ringback:
translating the H.323 protocol alerting message to a SIP protocol 180 ringing message at the interworking function;
sending the SIP protocol 180 ringing message from the interworking function to the SIP protocol calling endpoint and discarding, at the interworking function, all media sent from the H.323 called endpoint unless the media is accompanied by an appropriate H.323 protocol progress indicator so that local ringback is generated at the SIP protocol calling endpoint and no inappropriate media, such as silence, is played at the SIP protocol calling endpoint.

7. The method of claim 6 further comprising:
proxying, at the interworking function, media sent by the SIP protocol endpoint and by the H.323 protocol endpoint.

8. The method of claim 6 where the interworking function is a session border controller.

9. An apparatus comprising:
a processor; and
a memory in communication with the processor, the memory storing program instructions, the processor operative with the program instructions to:
receive SIP protocol messages and H.323 protocol messages at an interworking function used to connect calls between networks using the different protocols;
receive, at the interworking function, a SIP protocol response message from a SIP protocol called endpoint after an H.323 protocol calling endpoint initiates a call, with the SIP protocol response message indicating that the SIP protocol called endpoint might send media including a ringback tone to be played at the H.323 protocol calling endpoint and where the SIP protocol causes a SIP protocol calling endpoint to start a timer when a SIP protocol response message is received so that ringback will be generated locally if no ringback media to be played is received at the SIP protocol calling endpoint before the timer expires;
translate the SIP protocol response message to an H.323 protocol alerting message at the interworking function;
send the H.323 protocol alerting message and an H.323 protocol progress indicator from the interworking function to the H.323 protocol calling endpoint subsequent to receiving the SIP protocol response message at the interworking function, where the H.323 protocol calling endpoint generates a local ringback tone only if an H.323 protocol alerting message with no H.323 protocol progress indicator is received and where the H.323 protocol calling endpoint does not start a timer when an H.323 protocol alerting message and an H.323 protocol progress indicator are received;
maintain a timer at the interworking function;
start the timer maintained at the interworking function when the SIP protocol response message is received at the interworking function; and
send an H.323 protocol alerting message without an H.323 protocol progress indicator from the interworking function to the H.323 protocol calling endpoint to instruct the H.323 protocol calling endpoint to play a local ringback tone if the timer expires and no media is received from the SIP protocol called endpoint at the interworking function.

10. The apparatus of claim 9 with the processor further operative with the program instructions to:
proxy, at the interworking function, media sent by the SIP protocol endpoint and by the H.323 protocol endpoint.

11. The apparatus of claim 9 where the interworking function is a session border controller.

12. An apparatus comprising:
a processor; and
a memory in communication with the processor, the memory storing program instructions, the processor operative with the program instructions to:
receive a SIP protocol invite message at the interworking function that indicates a SIP protocol calling endpoint has initiated a call;
translate the SIP protocol invite message to an H.323 protocol setup message at the interworking function;
send the H.323 protocol setup message from the interworking function to the H.323 protocol called endpoint;
receive, at the interworking function, either an H.323 alerting message, ringback media and an H.323 progress indicator appropriate for forcing the playback of the ringback media from a H.323 protocol called endpoint in the case of remote ringback or receiving an H.323 protocol alerting message and no H.323 protocol progress indicator in the case of local ringback;
in the case of remote ringback:
translate the H.323 protocol alerting message to a SIP protocol 180 ringing message at the interworking function;
send the SIP protocol 180 ringing and the ringback media to be played from the interworking function to the SIP protocol calling endpoint so that the SIP protocol called endpoint plays the ringback media when received;
in the case of local ringback:
translate the H.323 protocol alerting message to a SIP protocol 180 ringing message at the interworking function;
send the SIP protocol 180 ringing message from the interworking function to the SIP protocol calling endpoint and discarding, at the interworking function, all media sent from the H.323 called endpoint unless the media is accompanied by an appropriate H.323 protocol progress indicator so that local ringback is generated at the SIP protocol calling endpoint and no inappropriate media, such as silence, is played at the SIP protocol calling endpoint.

13. The apparatus of claim 12 with the processor further operative with the program instructions to:
proxy, at the interworking function, media sent by the SIP protocol endpoint and by the H.323 protocol endpoint.

14. The apparatus of claim 12 where the interworking function is a session border controller.

* * * * *